(12) United States Patent
Ikawa (10) Patent No.: US 10,520,058 B2
(45) Date of Patent: Dec. 31, 2019

(54) ANTIVIBRATION DEVICE

(71) Applicant: TOYO TIRE & RUBBER CO., LTD., Itami-shi, Hyogo (JP)

(72) Inventor: Tatsuki Ikawa, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 15/846,670

(22) Filed: Dec. 19, 2017

(65) Prior Publication Data

US 2018/0172108 A1    Jun. 21, 2018

(30) Foreign Application Priority Data

Dec. 21, 2016    (JP) .................. 2016-247391

(51) Int. Cl.
| | |
|---|---|
| *F16F 13/10* | (2006.01) |
| *F16F 13/08* | (2006.01) |
| *B60K 5/12* | (2006.01) |
| *F16F 1/36* | (2006.01) |

(52) U.S. Cl.
CPC .......... *F16F 13/108* (2013.01); *B60K 5/1208* (2013.01); *F16F 1/36* (2013.01); *F16F 13/085* (2013.01); *F16F 13/10* (2013.01); *F16F 2224/0208* (2013.01)

(58) Field of Classification Search
CPC .... F16F 9/13; F16F 9/108; F16F 9/101; F16F 9/085; B60K 5/1208; B60K 5/1233; B60K 5/1291
USPC ............. 267/140.11, 140.13, 140.14, 140.15
See application file for complete search history.

(56) References Cited

U.S. PATENT DOCUMENTS

| | | | |
|---|---|---|---|
| 5,895,032 A | 4/1999 | Simuttis | |
| 8,517,359 B2 | 8/2013 | Graeve et al. | |
| 2002/0117788 A1 | 8/2002 | West | |
| 2002/0195758 A1* | 12/2002 | Yamamoto ............ | F16F 13/101 267/140.11 |

(Continued)

FOREIGN PATENT DOCUMENTS

| | | |
|---|---|---|
| EP | 1217251 A2 | 6/2002 |
| JP | 2016-50658 A | 4/2016 |
| WO | 2008/111610 A1 | 9/2008 |

OTHER PUBLICATIONS

Extended European Search Report dated Jun. 1, 2018, issued in counterpart European Application No. 17206133.5. (8 pages).

(Continued)

*Primary Examiner* — Thomas J Williams
(74) *Attorney, Agent, or Firm* — Westerman, Hattori, Daniels & Adrian, LLP (57) ABSTRACT

A junction with an antivibration base body joined to its outer periphery is equipped with a chamfer portion where a corner connecting a flange portion to the junction is removed, a base portion connected to the chamfer portion in the axial direction, and an end portion connected to the base portion in the axial direction. At the base portion, a first projection plane made by being projected in a first direction orthogonal to the axis is substantially the same in area as a second projection plane made by being projected in a second direction orthogonal to the axis and the first direction. At the end portion, the area of the second projection plane is set to be larger than the area of the first projection plane.

3 Claims, 3 Drawing Sheets

(56) References Cited

U.S. PATENT DOCUMENTS

| | | | |
|---|---|---|---|
| 2003/0030202 A1* | 2/2003 | Thomazeau | F16F 13/103 |
| | | | 267/140.13 |
| 2003/0038414 A1* | 2/2003 | Pizanti | F16F 13/103 |
| | | | 267/140.13 |
| 2003/0067104 A1 | 4/2003 | Takashima et al. | |
| 2006/0043657 A1 | 3/2006 | Tanaka | |
| 2006/0097436 A1* | 5/2006 | Yamamoto | F16F 13/101 |
| | | | 267/140.12 |
| 2009/0302515 A1* | 12/2009 | Graeve | F16F 13/108 |
| | | | 267/140.13 |
| 2010/0096787 A1 | 4/2010 | Kojima | |
| 2010/0102495 A1 | 4/2010 | Okumura et al. | |
| 2012/0306134 A1 | 12/2012 | Tanaka et al. | |
| 2016/0186830 A1 | 6/2016 | Furusawa et al. | |

OTHER PUBLICATIONS

Extended European Search Report dated May 22, 2018, issued in European Application No. 17206127.7 (counterpart to U.S. Appl. No. 15/846,654). (8 pages).

U.S. Appl. No. 15/846,654, filed Dec. 19, 2017.

Non-Final Office Action dated Dec. 18, 2018, issued in U.S. Appl. No. 15/846,654. (17 pages).

Office Action dated May 22, 2019, issued in counterpart CN Application No. 201711104028.X, with English translation. (10 pages).

Office Action dated May 28, 2019, issued in counterpart CN Application No. 201711104426.1, with English translation. (10 pages).

* cited by examiner

ANTIVIBRATION DEVICE

TECHNICAL FIELD

The present invention relates to an antivibration device and particularly to, an antivibration device with spring constants differing in two directions orthogonal to its axis.

BACKGROUND ART

As antivibration devices supporting a vibration source like an engine or the like on a vehicle body, there is known an antivibration device disclosed in Patent Literature 1, for example. In the antivibration device disclosed in Patent Literature 1, a shaft-like first fixture and a sleeve-like second fixture are connected by an antivibration base body including a rubber elastic body. At a portion joined to the antivibration base body of the first fixture, a first projection plane made by being projected in a first direction orthogonal to the axis is smaller in area than a second projection plane made by being projected in a second direction orthogonal to the axis and the first direction. Thus, it is possible to make a spring constant in the first direction smaller than that in the second direction.

CITATION LIST

Patent Literature

[Patent Literature 1] JP-A No. 2016-50658

SUMMARY OF INVENTION

Technical Problem

However, in the aforementioned related art, there is a requirement for improvement in the durability of the antivibration base body.

The present invention has been made in order to meet the aforementioned requirement, and an object of the present invention is to provide an antivibration device capable of improving the durability of an antivibration base body with spring constants made to differ in two directions orthogonal to its axis.

Solution to Problem

In order to accomplish this object, an antivibration device of the present invention is equipped with a shaft-like first fixture extending along an axis, a sleeve-like second fixture having on at least one side an opening larger than an external shape of the first fixture, an antivibration base body including a rubber elastic body and joined at least to the first fixture and the opening of the second fixture, and a restriction member secured to the second fixture for restraining the relative displacement of the first fixture. The first fixture is equipped with a junction having the antivibration base body joined to an outer periphery, a flange portion connected to the junction and having the antivibration base body joined, and a stopper portion including a rubber elastic body covering the flange portion and facing the restriction member. The junction is equipped with a chamfer portion where a corner connecting the flange portion and the junction is removed, a base portion connected to the chamfer portion in the axial direction, and an end portion connected to the base portion in the axial direction. At the base portion, a first projection plane made by being projected in a first direction orthogonal to the axis is substantially the same in area as a second projection plane made by being projected in a second direction orthogonal to the axis and the first direction, and the end portion is set to have the area of the second projection plane being larger than the area of the first projection plane.

Advantageous Effect of Invention

According to the antivibration device in a first aspect, the end portion with the antivibration base body joined thereto is such that the second projection plane made by being projected in the second direction orthogonal to the axis and the first direction is larger in area than the first projection plane made by being projected in the first direction orthogonal to the axis, and thus, it is possible to make a spring constant in the first direction smaller than that in the second direction. Since at the base portion, the first projection plane and the second projection plane are substantially the same in area, a distortion produced in the antivibration base body around the base portion can be made to be small. Furthermore, since the restriction member and the stopper portion can limit the displacement amount of the antivibration base body, an advantageous effect can be obtained in that the durability of the antivibration base body is improved with spring constants made to differ in the two directions orthogonal to the axis.

According to the antivibration device in a second aspect, the flange portion protrudes a pair of wall portions in the axial direction on a side opposite to the junction. The pair of wall portions face each other with the axis therebetween in the first direction or the second direction and are covered with the rubber elastic body forming the stopper portion. When the stopper portion formed on the pair of wall portions abuts on the restriction member, the displacement of the antivibration base body in the first direction or the second direction is restrained. Since the displacement in the first direction or the second direction of the antivibration base body is restrained, the load is limited, and thus, in addition to the advantageous effect of the first aspect, an advantageous effect can be obtained in that the durability of the antivibration base body is improved.

According to the antivibration device in a third aspect, the pair of wall portions respectively have extension portions connected to respective ones of respective two lateral sides. The extension portions extend in a direction to come close to each other and are disposed with a gap between edge portions of the extension portions. By the insertion of a part of a mating member secured to the first fixture into the gap between the edge portions of the extension portions, the detent of the mating member can be done. Therefore, in addition to the advantageous effect of the second aspect, an advantageous effect can be obtained in that the mating member is easily secured to the first fixture. Furthermore, since water can be discharged from between the extension portions, an advantageous effect can be obtained in that water is made to be difficult to gather at an portion surrounded by the wall portions and the extension portions.

According to the antivibration device in a fourth aspect, the pair of wall portions are arranged in the first direction. Since the spring constant in the first direction is smaller than the spring constant in the second direction, the arrangement of the pair of wall portions in the first direction make it easy to restrain the displacement of the antivibration base body in the first direction. The displacement of the antivibration base body in the first direction can be restrained to limit the load, and thus, in addition to the advantageous effect of the second aspect, an advantageous effect can be obtained in that the durability of the antivibration base body is improved.

According to the antivibration device in a fifth aspect, the antivibration base body is equipped with a connection portion surrounding a portion which, of the first fixture, extends from the base portion through the chamfer portion to the flange portion, and a leg portion connected to the connection portion and closing the opening of the second fixture. In a section including the axis, an outer peripheral surface of the junction is inclined, at a radially inside position of a boundary between the leg portion and the connection portion, relative to the axis to come close to the axis with distance from the flange portion. As a result, the thickness of the rubber elastic body surrounding the junction can be increased gradually from the connection portion toward the leg portion in the axial direction. Since a distortion produced at the boundary between the connection portion and the leg portion can be made to be small, it is possible to further improve the durability of the antivibration base body in addition to the advantageous effect of the first aspect.

DESCRIPTION OF EMBODIMENT

Figure 1:
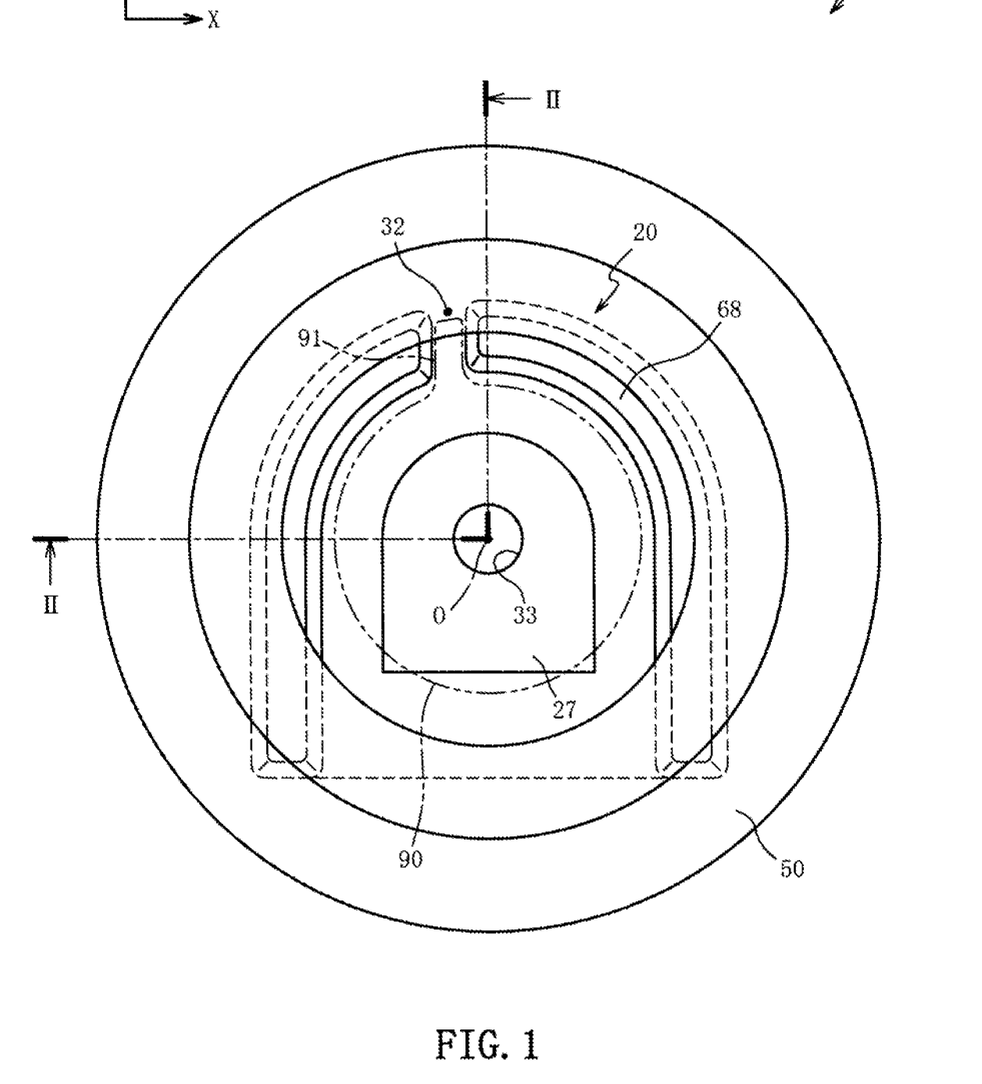
FIG. 1 is a plan view of an antivibration device in a first embodiment according to the present invention.
Figure 2:
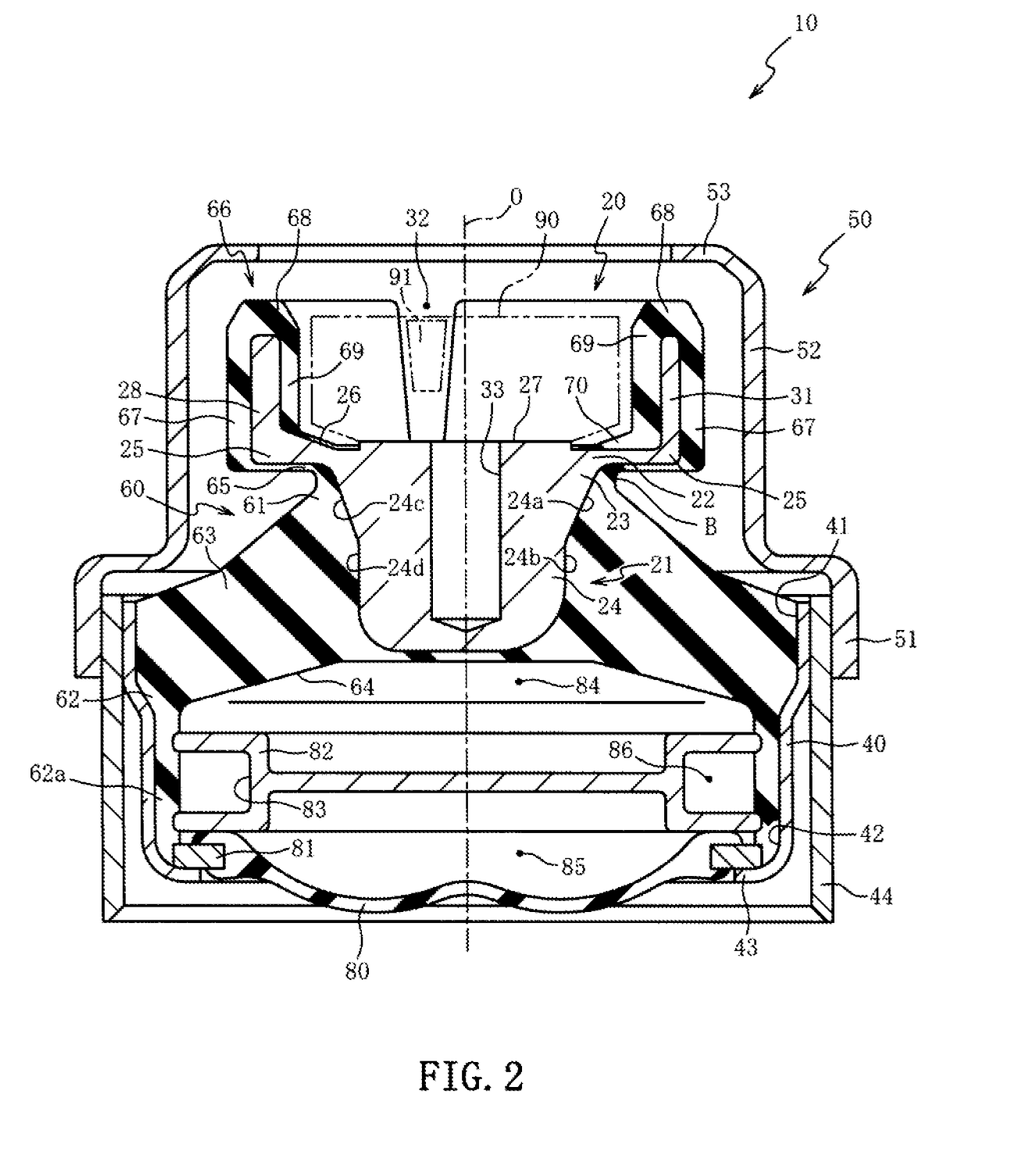
FIG. 2 is a sectional view of the antivibration device taken along the II-II line in FIG. 1.
Figure 3:
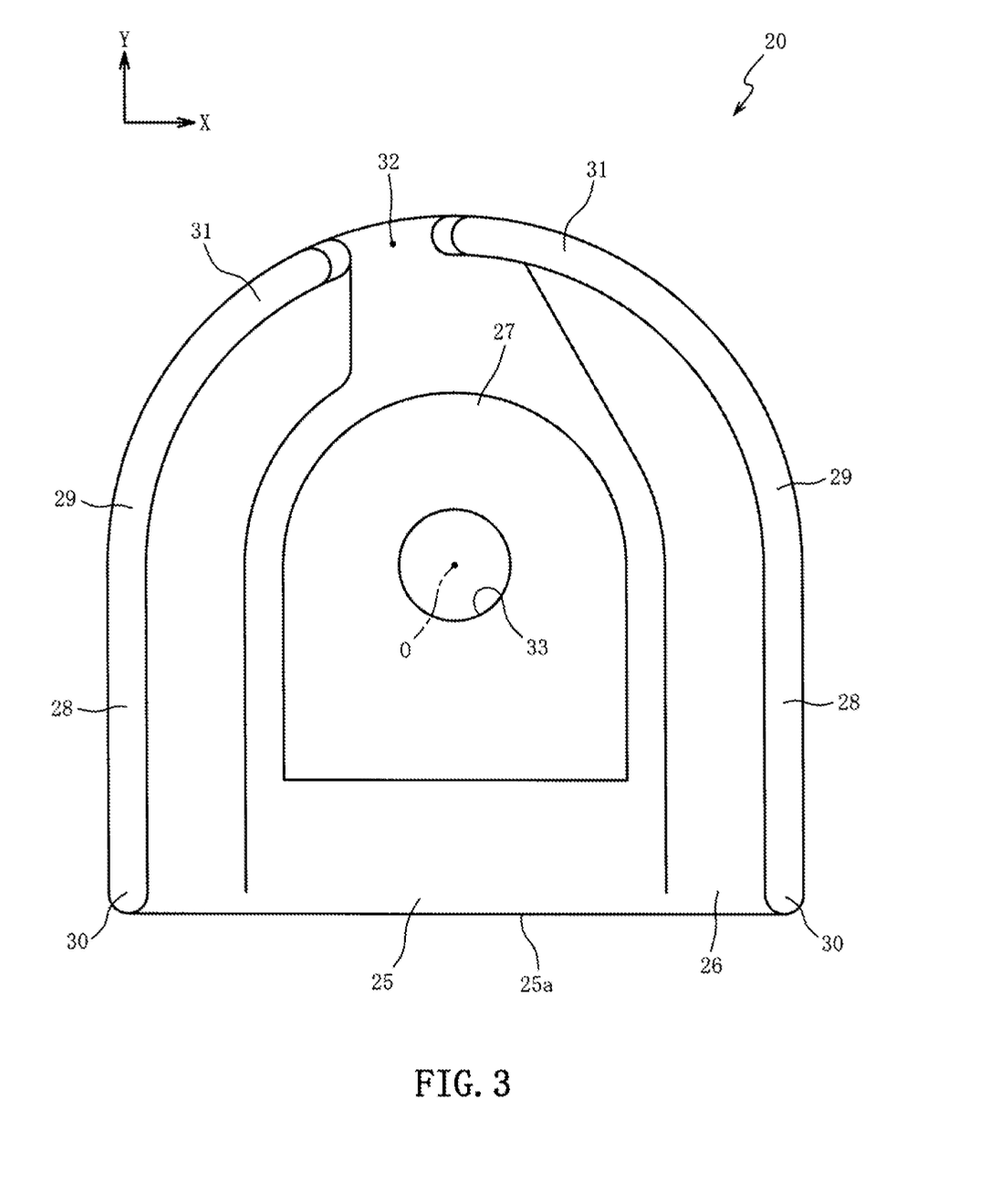
FIG. 3 is a plan view of a first fixture.

Hereinafter, a preferred embodiment of the present invention will be described with reference to the accompanying drawings. FIG. 1 is a plan view of an antivibration device 10 in a first embodiment according to the present invention, and FIG. 2 is a sectional view of the antivibration device 10 taken along the II-II line in FIG. 1. FIG. 3 is a plan view of a first fixture 20.

An arrow X and an arrow Y shown in FIG. 1 and FIG. 3 respectively represent a right-left direction (first direction) and a front-rear direction (second direction) of a motor vehicle mounting the antivibration device 10. An axis O direction (the direction normal to the drawing sheet of FIG. 1) represents a vertical direction of the motor vehicle and is a direction in which primary vibration is inputted to the antivibration device 10. Incidentally, FIG. 2 shows the antivibration device 10 in a no-load state.

As shown in FIG. 2, the antivibration device 10 is an engine mount for elastically supporting an engine of the motor vehicle and is equipped with a first fixture 20 attached to the engine (not shown) side being a vibration source, a second fixture 40 attached to a vehicle body (not shown) on a supporting side, and an antivibration base body 60 comprising a rubber elastic body and interposed between the first fixture 20 and the second fixture 40 to join the first fixture 20 and the second fixture 40.

The first fixture 20 is a shaft-like casting integrally made of an iron-base material, an aluminum alloy or the like and extending along the axis O. The first fixture 20 is equipped with a junction 21 with the antivibration base body 60 joined at its outer periphery and a flange portion 25 connected to the junction 21. The flange portion 25 is formed at its center with a bolt hole 33 extending along the axis O. The first fixture 20 is attached to the vibration source such as the engine through a bolt (not shown) screwed in the bolt hole 33. In the present embodiment, the first fixture 20 is attached to the vibration source such as the engine through a bracket 90.

The junction 21 is equipped with a chamfer portion 22, a base portion 23 and an end portion 24. The chamfer portion 22 is a region where a corner connecting the flange portion 25 to the junction 21 is removed to be made as a circular shape or a slant surface. In the present embodiment, the chamfer portion 22 is a circle adjoining to the flange portion 25 and the base portion 23.

The base portion 23 is a region connected to the chamfer portion 22 in the axis O direction (on the opposite side to the flange portion 25). The base portion 23 takes a frustoconical shape in the present embodiment. At the base portion 23, a first projection plane made by projecting the base portion 23 in the first direction (the arrow X direction in FIG. 1) orthogonal to the axis O is set to be substantially the same in area as a second projection plane made by projecting the base portion 23 in the second direction (the arrow Y direction in FIG. 1) orthogonal to the axis O and the first direction.

In FIG. 2, the first projection plane is a plane formed by combining a right side portion of the axis O as a boundary with a portion formed by turning the right side portion around the axis O as a symmetry axis. The second projection plane is a plane formed by combining a left side portion of the axis O as the boundary with a portion formed by turning the left side portion around the axis O as the symmetry axis. That is, of the junction 21, the base portion 23 is a portion where the right and left areas with the axis O put therebetween in FIG. 2 become substantially the same.

Incidentally, being substantially the same in area between the two projection planes of the base portion 23 does mean to also encompass slightly differing in area between the two projection planes besides being completely the same in size between the two projection planes. The degree of slightly differing in area between the two projection planes means the degree which does not become an obstruction in restraining (referred to later) the distortion at a portion which, of the antivibration base body 60, is joined to the periphery of the base portion 23.

The end portion 24 is a region connected to the base portion 23 in the axis O direction (on the opposite side to the flange portion 25). The end portion 24 takes a flat shape wherein a first projection plane made by projecting the end portion 24 in the first direction (the arrow X direction in FIG. 1) is smaller in area than a second projection plane made by projecting the end portion 24 in the second direction (the arrow Y direction in FIG. 1). That is, the end portion 24 is a portion which is of the junction 21 and at which the area on the left side of the axis O in FIG. 2 is larger than the area on the right side.

In the present embodiment, the end portion 24 has outer peripheral surfaces 24a, 24b appearing on the first projection plane and has outer peripheral surfaces 24c, 24d appearing on the second projection plane. The outer peripheral surfaces 24a, 24b are connected along the axis O in a direction going away from the flange portion 25, and so are the outer peripheral surfaces 24c, 24d. In a section including the axis O, the outer peripheral surfaces 24a, 24c are inclined to make the distance from the axis O become smaller gradually with distance from the flange portion 25. In the section including the axis O, the angle which the outer peripheral surface 24a makes with the axis O is larger than the angle which the outer peripheral surface 24c makes with the axis O.

In the section including the axis O, the outer peripheral surfaces 24b, 24d have portions being almost parallel to the axis O, and at the almost parallel portions, the distance between the outer peripheral surface 24b and the axis O is smaller than the distance between the outer peripheral surface 24d and the axis O. In the section including the axis O, the length in the axis O direction of the sum of the outer peripheral surface 24a and the outer peripheral surface 24b is almost the same as the length in the axis O direction of the sum of the outer peripheral surface 24c and the outer peripheral surface 24d. Thus, the end portion 24 takes a flat frustoconical shape on a root side close to the flange portion 25 and takes a flat pillar shape on an end side remote from the flange portion 25.

Further, the mean value of outer diameters at a center position in the axis O direction of the end portion 24 is set to be smaller than the mean value of outer diameters at a center position in the axis O direction of the base portion 23. Incidentally, the mean value of the outer diameters at the center position in the axis O direction of the base portion 23 means the diameter of a circle having the same area as the area of a section that is obtained by cutting the base portion 23 in a direction orthogonal to the axis O at a center position in the axis O direction of the base portion 23. The mean value of the outer diameter at the center position in the axis O direction of the end portion 24 means the diameter of a circle having the same area as the area of a section that is obtained by cutting the end portion 24 in a direction orthogonal to the axis O at a center position in the axis O direction of the end portion 24.

The flange portion 25 is a region having the external shape larger than the outer diameter of the base portion 23. As shown in FIG. 3, the flange portion 25 takes the shape of an elongated semi-circle having a straight side 25a as viewed in the axis O direction. The flange portion 25 is formed at the periphery with a slant surface 26 of a falling gradient directed toward a center and is formed with a flat seating surface 27 at the center. The seating surface 27 is a surface for bearing the bracket 90 (refer to FIG. 2) and protrudes in the axis O direction (the direction normal to the drawing sheet of FIG. 3). The bolt hole 33 is formed at the center of the seating surface 27.

At the flange portion 25, a pair of wall portions 28 protruding in the axis O direction are provided at edge portions which are each connected to the side 25a with a corner therebetween. The pair of wall portions 28 face each other with the axis O therebetween. In the present embodiment, the pair of wall portions 28 face each other in the first direction (the arrow X direction in FIG. 3). The wall portions 28 each have two lateral sides 29, 30 parallel to the axis O, and the lateral sides 29 are connected respectively to extension portions 31. The extension portions 31 extend in a direction to come close to each other and are arranged outside the seating surface 27 with a gap 32 secured between edge portions thereof. In the present embodiment, the extension portions 31 are curved to take a semi-cylindrical shape with their center on the axis O.

Referring back to FIG. 2, the second fixture 40 is a sleeve-like member of a high rigidity having an inner diameter larger than the outer diameter of the junction 21 and is formed with openings 41, 42 at opposite ends in the axis O direction. With the junction 21 directed toward the opening 41 side, the first fixture 20 is disposed to be spaced from the second fixture 40 on the same axis O. A restriction member 50 is secured to the second fixture 40 through an outer sleeve 44 secured to the outer periphery of the second fixture 40.

The restriction member 50 is a high rigidity member for restraining the relative displacement between the first fixture 20 and the second fixture 40 through an abutment on a stopper portion 66 (referred to later). The restriction member 50 is equipped with a sleeve-like retainer portion 51 fitting the second fixture 40 therein, a sleeve-like first restriction portion 52 extending from the retainer portion 51 in the axis O direction, and an annular second restriction portion 53 protruding radially inward from an end portion in the axis O direction of the first restriction portion 52. In the present embodiment, the first restriction portion 52 takes a cylindrical shape with its center on the axis O.

The antivibration base body 60 is a member constituted by a rubber elastic body and is equipped with a small-diameter side end portion 61 on one end side in the axis O direction, a large-diameter side end portion 62 on the other end side, and a leg portion 63 connecting the small-diameter side end portion 61 and the large-diameter side end portion 62. The small-diameter side end portion 61 is a region to which the junction 21 of the first fixture 20 is joined through vulcanization at its outer periphery. Since the junction 21 is joined to the small-diameter side end portion 61, the junction 21 is embedded in the antivibration base body 60. The large-diameter side end portion 62 is a region whose outer diameter is formed to be larger than that of the small-diameter side end portion 61. The large-diameter side end portion 62 is joined through vulcanization at its outer peripheral surface to an inner peripheral surface on the opening 41 side of the second fixture 40.

Since the antivibration base body 60 is joined through vulcanization to the first fixture 20 and the second fixture 40, the leg portion 63 closing the opening 41 of the second fixture 40 is interposed between the first fixture 20 and the second fixture 40. The leg portion 63 takes a frustoconical shape. The antivibration base body 60 is formed with a concave portion 64 at an end surface in the axis O direction of the large-diameter side end portion 62. The concave portion 64 expands its inner diameter with distance from the first fixture 20 in the axis O direction. The antivibration base body 60 is formed with a sleeve-like sealing layer 62a which extends in the axis O direction from the whole circumference at an outer peripheral rim of the large-diameter side end portion 62. The sealing layer 62a is joined through vulcanization to an inner peripheral surface of the second fixture 40.

The antivibration base body 60 has a connection portion 65 connected to the small-diameter side end portion 61. The connection portion 65 surrounds a portion which, of the first fixture 20, extends from the chamfer portion 22 to the flange portion 25. The connection portion 65 is a region that connects the small-diameter side end portion 61 and the stopper portion 66. In the antivibration base body 60, the outer diameter of a portion (a part of the leg portion 63) surrounding the end portion 24 is set to be larger than the outer diameter of a portion (a part of the connection portion 65) surrounding the chamfer portion 22.

The stopper portion 66 is a rubber elastic body covering the flange portion 25. The stopper portion 66 restrains the relative displacement of the first fixture 20 to the second fixture 40 upon abutting on the restriction member 50. The stopper portion 66 is equipped with outer side portions 67 covering the outer side surfaces of the wall portions 28 and the extension portions 31 and top portions 68 covering end surfaces in the axial O direction of the wall portions 28 and the extension portions 31. Inner side surfaces of the wall portions 28 and the extension portions 31 are covered with inner side portions 69 comprising a rubber elastic body and connected to the top portions 68. Except for the seating surface 27, the end surface of the flange portion 25 including the slant surface 26 is covered with a membrane portion 70 including a rubber elastic body and connected to the inner side portions 69.

Referring back to FIG. 1, the rubber elastic body covering the flange portion 25 covers the extension portions 31 (refer to FIG. 3) with the gap 32 left to remain. The membrane portion 70 is provided with a falling gradient directed from the circumference toward the center (the seating surface 27) and the gap 32. When the bracket 90 attached to the vibration source such as the engine is secured to the first fixture 20, the bracket 90 is seated on the seating surface 27 with a protrusion 91 protruding from a lateral surface of the bracket 90 inserted into the gap 32. When the bolt (not shown) is fastened into the bolt hole 33, the protrusion 91 interferes with the extension portions 31 to make the detent of the bracket 90. Accordingly, it can be done easily to secure the bracket 90 (the mating member) to the first fixture 20.

Since the flange portion 25 is provided with the wall portions 28 and the extension portions 31 except for the side 25a, it is possible to insert the bracket 90 between the wall portions 28 from the side of the side 25a and to dispose the bracket 90 on the seating surface 27. Thus, it becomes easier to dispose the bracket 90 on the seating surface 27. Further, since the gap 32 is provided on a side opposite to the side 25a with the axis O put therebetween, the protrusion 91 protruding from the lateral surface of the bracket 90 can easily be inserted into the gap 32 when the bracket 90 is inserted between the wall portions 28 from the side of the side 25a.

Since the membrane portion 70 constituted by the rubber elastic body is provided over the flange portion 25 except for the seating surface 27, the bracket 90 can be closely adhered to the seating surface 27. As a result, the bolt (not shown) fastened into the bolt hole 33 to secure the bracket 90 onto the seating seat 27 can be made to be difficult to be loosened.

As shown in FIG. 2, a distance in the axis O direction exists between the protrusion 91 of the bracket 90 inserted into the gap 32 and the membrane portion 70 covering the flange portion 25. Although the flange portion 25 is surrounded at portions except for the side 25a by the wall portions 28 and the extension portions 31, the gap 32 is provided, so that the flange portion 25 is able to discharge from the gap 32 car washing water and rainwater gathered inside the wall portions 28 and the extension portions 31. The membrane portion 70 can easily discharge the water because of being provided with the falling gradient which is directed from the circumference toward the center (the seating surface 27) and the gap 32.

The outer side portions 67 of the stopper portion 66 face the first restriction portion 52 of the restriction member 50. When the outer side portion 67 abuts on the first restriction portion 52, the relative displacement is restrained between the first fixture 20 and the second fixture 40 in a direction orthogonal to the axis O. The outer side portions 67 are provided to stand in rows in the first direction (the arrow X direction in FIG. 1) with the axis O put therebetween. Top portions 68 of the stopper portion 66 face the second restriction portion 53 of the restriction member 50. When the top portions 68 abut on the second restriction portion 53, the relative displacement is restrained between the first fixture 20 and the second fixture 40 in the axis O direction.

The second fixture 40 attaches to the opening 42 a diaphragm 80 facing the large-diameter side end portion 62 (the concave portion 64) of the antivibration base body 60. The diaphragm 80 is a round-shape flexible membrane constituted by a rubber elastic body and has an annular metal fitting 81 jointed through vulcanization at its outer peripheral rim.

A closed space partitioned by the second fixture 40, the antivibration base body 60 and the diaphragm 80 encloses therein a liquid (an incompressible fluid such as water) and defines a liquid chamber. The liquid chamber is divided by a partitioning member 82 into a pressure receiving chamber 84 and an equilibrium chamber 85, wherein the antivibration base body 60 defines a part of chamber walls of the pressure receiving chamber 84 while the diaphragm 80 defines a part of chamber walls of the equilibrium chamber 85. The partitioning member 82 is in close contact at its outer periphery with the sealing layer 62a to divide the liquid chamber into the pressure receiving chamber 84 and the equilibrium chamber 85. Between a groove 83 formed on its outer periphery and the sealing layer 62a, the partitioning member 82 forms an orifice 86 which makes the pressure receiving chamber 84 and the equilibrium chamber 85 communicate with each other.

The partitioning member 82 and the diaphragm 80 are inserted from the opening 42 into the second fixture 40 in order of the partitioning member 82 and the diaphragm 80. Thereafter, the second fixture 40 is subjected to a diameter reduction process, and an end portion 43 of the second fixture 40 is bent inside to be contacted closely with the metal fitting 81. Thus, the partitioning member 82 and the diaphragm 80 are secured inside the second fixture 40.

At the end portion 24 of the first fixture 20 with the antivibration base body 60 joined thereto, the area of the second projection plan made by projecting the end portion 24 in the second direction (the arrow Y direction in FIG. 1) is larger than the area of the first projection plane made by projecting the end portion 24 in the first direction (the arrow X direction in FIG. 1). Therefore, the spring in the first direction is made to be softer than the spring in the second direction. By making the first direction of the antivibration device 10 agree with the right-left of the vehicle and the second direction of the antivibration device 10 agree with the front-rear of the vehicle, a vibration isolation effect in the vehicle front-rear direction is performed to mitigate vibration caused by acceleration, deceleration and the like. In contrast, a vibration damping effect in the vehicle right-left direction is performed to improve the ride quality.

Since the areas of the projection planes in the two directions of the end portion 24 of the first fixture 20 are made to differ to make the springs in the two directions differ, it is possible to make influence hard to be exerted on the free lengths of the leg portion 63 in the first direction (the X direction) and the second direction (the Y direction). Since the free length of the leg portion 63 can be prevented from becoming short, the buckling of the leg portion 63 can be prevented even where a large displacement is inputted between the first fixture 20 and the second fixture 40. Further, since the external shape of the antivibration base body 60 does not need to be altered, it is not required to alter a mold used for performing a vulcanization molding of the antivibration base body 60. Alternatively, the alteration of the mold can be restrained to a minimum. As a result, it is possible to make the effective use of an existing facility.

In the antivibration base body 60, a portion (a part of the leg portion 63) surrounding the end portion 24 is larger in outer diameter than a portion (a part of the connection portion 65) surrounding the chamfer portion 22. Thus, when a load is inputted, a large distortion is produced at a boundary B (the surface and the inside) between the connection portion 65 and the leg portion 63. In order to make this distortion small, the first fixture 20 is formed with the base portion 23.

At the base portion 23, the area of the first projection plane made by projecting the base portion 23 in the first direction (the arrow X direction in FIG. 1) is substantially the same as the area of the second projection plane made by projecting the base portion 23 in the second direction (the arrow Y direction in FIG. 1). The connection portion 65 surrounding the base portion 23 is small in volume and thin in comparison with the leg portion 63, and thus, compared with the case that the base portion 23 does not exist, the connection portion 65 can be made to be hard by being given an influence of the base portion 23. Because of an increase in the hardness of the connection portion 65, the distortion produced at the boundary B between the connection portion 65 and the leg portion 63 can be restrained. As a result, it is possible to improve the durability of the antivibration base body 60.

Further, in the section including the axis O, the outer peripheral surfaces 24a, 24c of the base portion 23 of the first fixture 20 are inclined relative to the axis O. Thus, it is possible to make the thickness of the rubber elastic body surrounding the junction 21 in the circumferential direction increase gradually with distance from the flange portion 25 in the axis O direction. Since it is possible to make the influence of the base portion 23 is difficult to be exerted on the leg portion 63 with distance from the flange portion 25, the leg portion 63 buffers the distortion produced at the boundary B between the connection portion 65 and the leg portion 63. As a result, the distortion produced at the boundary B between the connection portion 65 and the leg portion 63 can be made to be small, and hence, it is possible to improve the durability of the antivibration base body 60.

The first fixture 20 is formed with the chamfer portion 22 where the corner connecting the flange portion 25 to the junction 21 is removed, and thus, of the connection portion 65, a portion covering the chamfer portion 22 can avoid having a load concentrated thereon. As a result, of the connection portion 65, a portion covering the chamfer portion 22 can be prevented from having a crack produced thereat.

The first fixture 20 is equipped with the stopper portion 66 including the rubber elastic body covering the flange portion 25. Since the restriction member 50 (the second restriction portion 53) secured to the second fixture 40 faces the stopper portion 66 (the top portion 68) in the axis O direction to restrain the relative displacement to the first fixture 20, it is possible to limit the tensile load exerted on the antivibration base body 60 in the axis O direction. As a result, it is possible to improve the durability of the antivibration base body 60.

Further, since the restriction member 50 (the first restriction portion 52) secured to the second fixture 40 faces the stopper portion 66 (the outer side portions 67) in a direction orthogonal to the axis O to restrain the relative displacement of the first fixture 20, it is possible to limit a tensile load exerted on the antivibration base body 60 in the direction orthogonal to the axis O. As a result, it is possible to improve the durability of the antivibration base body 60.

Since in the antivibration device 10, the spring constant in the first direction (the arrow X direction in FIG. 1) is smaller than the spring constant in the second direction (the arrow Y direction in FIG. 1), the pair of wall portions 28 provided on the flange portion 25 are arranged in the first direction. Since the pair of wall portions 28 are arranged in the first direction, the displacement of the antivibration base body 60 in the first direction is restrained when the outer side portion 67 (the stopper portion 66) provided on the wall portion 28 abuts on the first restriction portion 52 (the restriction member 50). Since the displacement of the antivibration base body 60 in the first direction which is soft in spring in comparison with the second direction can be restrained to limit the load, it is possible to improve the durability of the antivibration base body 60.

Incidentally, in order to meet the properties required for the antivibration device 10, it is possible as a matter of course to arrange in the second direction the pair of wall portions 28 provided on the flange portion 25. Where the pair of wall portions 28 are arranged in the second direction, the displacement of the antivibration base body 60 in the second direction is restrained when the outer side portion 67 (the stopper portion 66) provided on the wall portion 28 abuts on the first restriction portion 52 (the restriction member 50). In this case, the antivibration base body 60 is restrained from being displaced in the second direction which is hard in spring in comparison with the first direction, to limit the load exerted thereon.

Hereinabove, the present invention has been described based on the embodiments. However, the present invention is not in any way limited to the foregoing embodiments, and it can easily be inferred that various modifications for improvement are possible without departing from the gist of the present invention. For example, in order to meet properties required, it is possible to suitably set the shapes of the first fixture 20, the second fixture 40 and the antivibration base body 60, the position of the first fixture 20 relative to the second fixture 40, and the like.

In the foregoing embodiments, description has been made regarding the example of the liquid sealed antivibration device 10 wherein a liquid is enclosed between the antivibration base body 60 and the diaphragm 80. However, the present invention is not necessarily limited to this example. It is possible as a matter of course to omit the diaphragm 80, the partitioning member 82 and the like and to make an application to an antivibration device of a non-liquid sealed type which only utilizes the antivibration base body 60 (the property of the rubber elastic body). This is because even in the antivibration device of the non-liquid sealed type, it is possible to make the spring constants in two directions orthogonal to the axis O differ in dependence on the shape of the first fixture 20.

In the foregoing embodiments, description has been made regarding the example wherein the openings 41, 42 are formed on the opposite ends of the second fixture 40. However, the present invention is not necessarily limited to this example. For example, in the case of the antivibration device of the non-liquid sealed type wherein the diaphragm 80, the partitioning member 82 and the like are omitted, it is possible to configure the second fixture 40 as one which takes the form of a bottomed sleeve with one of the openings 42 omitted.

In the foregoing embodiments, description has been made regarding the example wherein the chamfer portion 22 of the first fixture 20 is rounded. However, the present invention is not necessarily limited to this example. It is possible as a matter of course to provide the chamfer portion 22 with a chamfering which forms a slant on the corner. Even where the chamfering is provided at the chamfer portion 22, it is possible to prevent a load from being concentrated on a portion which, of the connection portion 65, covers the chamfer portion 22.

In the foregoing embodiments, description has been made regarding the antivibration device 10 equipped with the second fixture 40 and the antivibration base body 60 which are formed to be nearly circular as viewed in the axial direction. However, the present invention is not necessarily limited to this example. For example, it is possible as a matter of course to form the shapes (external shapes) of the second fixture 40 and the antivibration base body 60 into an elongated circular shape or an elliptical shape as viewed in the axial direction. This makes it possible to effectively use an installation space for the antivibration device and hence, to improve the mountability on a motor vehicle or the like. Incidentally, the elongated circular shape means an oval shape or a racetrack shape, that is, a shape which is formed by two half circles mutually identical in dimension and two straight lines connecting these smoothly.

In the foregoing embodiments, description has been made regarding the example wherein the first direction in which the area of the projection plane of the junction 21 (the first fixture 20) is small is disposed in the vehicle right-left direction while the second direction in which the area of the projection plane of the junction 21 is large is disposed in the vehicle front-rear direction. However, the present invention is not necessarily limited to this example. In order to meet a performance required, it is possible as a matter of course to dispose in the vehicle front-rear direction the first direction in which the projection plane of the junction 21 is small in area, and to dispose in the vehicle right-left direction the second direction in which the projection plane of the junction 21 is large in area. By disposing the antivibration device 10 like this, it is possible to make the spring constant in the vehicle front-rear direction smaller than the spring constant in the vehicle right-left direction.

In the foregoing embodiments, description has been made regarding the example wherein the engine constituting a vibration source is attached to the first fixture 20 while the vehicle body on the supporting side is attached to the second fixture 40. However, the present invention is not necessarily limited to this example. It is possible as a matter of course to attach the first fixture 20 to the supporting side (vehicle body) by the use of a suitable bracket (not shown) and to attach the second fixture 40 to the vibration source (engine).

In the foregoing embodiments, description has been made regarding the example wherein the antivibration device 10 is used as an engine mount for elastically supporting an automotive engine. However, the present invention is not necessarily limited to this example. It is possible as a matter of course to apply the present invention to antivibration devices used in a railway train, a motorcycle, a bicycle and the like without being limited to an antivibration device for a motor vehicle. Further, it is possible as a matter of course to make application to various antivibration devices not only for engine mount but also for body mount, differential gear mount and the like.

The invention claimed is:

1. An antivibration device comprising:
a shaft-shape first fixture extending along an axis;
a sleeve-shape second fixture having on at least one side an opening larger than an external shape of the first fixture;
an antivibration base body including a rubber elastic body and joined at least to the first fixture and the opening of the second fixture; and
a restriction member secured to the second fixture for restraining the relative displacement of the first fixture;
wherein the first fixture is equipped with a junction having the antivibration base body joined to an outer periphery;
a flange portion connected to the junction and having the antivibration base body joined; and
a stopper portion including the rubber elastic body covering the flange portion and facing the restriction member;
wherein the junction is equipped with a chamfer portion where a corner connecting the flange portion and the junction is removed;
a base portion connected to the chamfer portion in the axial direction; and
an end portion connected to the base portion in the axial direction, wherein said axis extends through said base and said end portion and wherein outer peripheral surfaces of the end portion connect along the axis; and
wherein at the base portion, a first projection plane made by being projected in a first direction orthogonal to the axis is substantially the same in area as a second projection plane made by being projected in a second direction orthogonal to the axis and the first direction; and
wherein the end portion is set to have the area of the second projection plane being larger than the area of the first projection plane;
the flange portion is equipped with a pair of wall portions covered with the rubber elastic body and protruding in the axial direction on a side opposite to the junction to form the stopper portion;
the pair of wall portions face each other with the axis between the pair of wall portions in the first direction or the second direction;
the pair of wall portions are equipped with extension portions respectively connected to two lateral sides on one side and extending in a direction to come close to each other; and
edge portions of the extension portions are disposed with a gap between the edge portions.

2. The antivibration device according to claim 1, wherein the pair of wall portions are arranged in the first direction.

3. The antivibration device according to claim 1,
wherein the antivibration base body is equipped with a connection portion surrounding a portion which, of the first fixture, extends from the base portion through the chamfer portion to the flange portion; and
a leg portion connected to the connection portion and closing the opening of the second fixture; and
wherein in a section including the axis, an outer peripheral surface of the junction is inclined, at a radially inside position of a boundary between the leg portion and the connection portion, relative to the axis to come close to the axis with distance from the flange portion.

* * * * *